US010195619B2

(12) United States Patent
Lacroix

(10) Patent No.: US 10,195,619 B2
(45) Date of Patent: Feb. 5, 2019

(54) CATALYTIC CRACKING SPRAY NOZZLE ASSEMBLY WITH LIQUID INLET EXTENSION AND DIFFUSER

(71) Applicant: Spraying Systems Co., Wheaton, IL (US)

(72) Inventor: Mark Lacroix, Thornton, NH (US)

(73) Assignee: Spraying Systems Co., Wheaton, IL (US)

( * ) Notice: Subject to any disclaimer, the term of this patent is extended or adjusted under 35 U.S.C. 154(b) by 60 days.

(21) Appl. No.: 15/023,469

(22) PCT Filed: Sep. 18, 2014

(86) PCT No.: PCT/US2014/056343
§ 371 (c)(1),
(2) Date: Mar. 21, 2016

(87) PCT Pub. No.: WO2015/042280
PCT Pub. Date: Mar. 26, 2015

(65) Prior Publication Data
US 2016/0228895 A1 Aug. 11, 2016

Related U.S. Application Data

(60) Provisional application No. 61/880,308, filed on Sep. 20, 2013.

(51) Int. Cl.
*B01J 8/18* (2006.01)
*B05B 7/02* (2006.01)
(Continued)

(52) U.S. Cl.
CPC ............ *B05B 7/025* (2013.01); *B01J 8/1818* (2013.01); *B01J 8/1827* (2013.01); *B01J 8/1845* (2013.01);
(Continued)

(58) Field of Classification Search
CPC ................... B01J 8/1818; B01J 8/1845; B01J 2208/00902; B01J 8/22; B01J 8/1827;
(Continued)

(56) References Cited

U.S. PATENT DOCUMENTS

| 4,591,099 A * | 5/1986 | Emory | B05B 1/042 239/419 |
| 4,989,788 A * | 2/1991 | Bendig | B05B 1/042 239/429 |

(Continued)

FOREIGN PATENT DOCUMENTS

CN 1298434 C 2/2007

OTHER PUBLICATIONS

International Search Report dated Jan. 14, 2015, in International Patent Application No. PCT/US2014/056343.
(Continued)

*Primary Examiner* — Darren W Gorman
*Assistant Examiner* — Juan C Barrera
(74) *Attorney, Agent, or Firm* — Leydig, Voit & Mayer, Ltd.

(57) ABSTRACT

A gas assisted liquid spray nozzle assembly having a nozzle body that defines a mixing zone, a liquid inlet communicating with the mixing zone from a side thereof, and a pressurized gas inlet communicating with the mixing chamber from an upstream end. The liquid inlet includes a liquid inlet extension and diffuser post extending transversely into the mixing zone having a liquid extension passageway and a closed downstream end that defines an internal impingement surface disposed on a central axis of the mixing zone against which liquid impinges and is transversely directed into the mixing zone for atomization by pressurized gas directed centrally through the mixing zone from the gas inlet. The spray nozzle assembly includes a barrel extension
(Continued)

zone downstream of said mixing zone with a spray tip for directing the atomized liquid in a predetermined spray pattern.

6 Claims, 3 Drawing Sheets (51) Int. Cl.
*B05B 7/04* (2006.01)
*C10G 11/18* (2006.01)
*B05B 1/04* (2006.01)

(52) U.S. Cl.
CPC ............ *B05B 7/0483* (2013.01); *C10G 11/18* (2013.01); *B01J 2208/00902* (2013.01); *B05B 1/044* (2013.01)

(58) Field of Classification Search
CPC .... B01J 8/20; B01J 19/26; B01J 4/002; B05B 7/0466; B05B 7/025; B05B 7/04; B05B 7/0408; B05B 7/0416; B05B 7/0458; B05B 7/0483; B05B 1/044; B05B 1/042; B05B 1/26; B05B 7/0475; B05B 1/3436; C10G 11/18
USPC ...... 239/424, 424.5, 426, 590, 590.3, 590.5, 239/418–434.5, 518, 520, 521, 524
See application file for complete search history.

(56) References Cited

U.S. PATENT DOCUMENTS

| | | | | | |
|---|---|---|---|---|---|
| 5,176,325 | A * | 1/1993 | Vidusek | B05B 7/0483 | 239/419.3 |
| 5,553,785 | A | 9/1996 | Haruch | | |
| 5,603,453 | A * | 2/1997 | Weaver | B05B 7/0075 | 239/419.3 |
| 5,921,472 | A * | 7/1999 | Haruch | B01J 8/1827 | 239/432 |
| 6,161,778 | A | 12/2000 | Vidusek et al. | | |
| 7,036,753 | B2 | 5/2006 | Huffman | | |
| 2010/0230516 | A1* | 9/2010 | Solie | B01F 5/0614 | 239/428 |
| 2012/0063961 | A1* | 3/2012 | Chan | B01J 8/1827 | 422/140 |
| 2013/0186982 | A1 | 7/2013 | Vidusek et al. | | |

OTHER PUBLICATIONS

First Office Action dated Jul. 10, 2017, in Chinese Patent Application No. 201480063308.9.
Examination Report dated Apr. 24, 2017, in European Patent Application No. 14845900.1.

* cited by examiner

CATALYTIC CRACKING SPRAY NOZZLE ASSEMBLY WITH LIQUID INLET EXTENSION AND DIFFUSER

CROSS-REFERENCE TO RELATED APPLICATIONS

This patent application claims the benefit of U.S. Provisional Patent Application No. 61/880,308, filed Sep. 20, 2013, which is incorporated by reference.

FIELD OF THE INVENTION

The present invention relates generally to liquid spray nozzles, and more particularly, to spray nozzle assemblies particularly adapted for atomizing and spraying a liquid feed to a fluidized catalytic cracking riser reactor.

BACKGROUND OF THE INVENTION

A spray nozzle assembly of the foregoing type is shown and described in U.S. Pat. No. 5,921,472, the disclosure of which is incorporated by reference. Such spray nozzle assemblies typically include a nozzle body which defines a mixing chamber into which a liquid hydrocarbon and pressurized gas, such as steam, are introduced and within which the liquid hydrocarbon is atomized. To enhance liquid atomization within the mixing chamber, an impingement pin extends into the chamber and defines liquid impingement surface on the center line of the mixing chamber in diametrically opposed relation to the liquid inlet against which a pressurized liquid stream impinges and is transversely dispersed and across which pressurized steam from a gas inlet is directed for further interaction and shearing of the liquid into fine droplets. The atomized liquid within the mixing chamber is directed under the force of the pressurized steam through an elongated tubular barrel, commonly disposed within a wall of the catalytic reactor riser, for discharge from a spray tip at a downstream end thereof within the riser.

The nozzle body of such spray nozzle assemblies, which defines the mixing chamber and receives the impingement pin, a liquid hydrocarbon inlet, and a pressurized steam inlet, is a relatively expensive component of the spray nozzle assembly. The nozzle body commonly is machined from solid metal stock, which due to its complexity, is laborious and time consuming, substantially increasing the cost of the nozzle assembly. Providing the several individual components within the nozzle body further adds to the cost.

In such spray nozzle assemblies, the liquid hydrocarbon flow stream also must pass through half the diameter of the mixing chamber before it impacts the impingement pin. Particularly in spray nozzle assemblies with relatively large diameter mixing chambers, such as those having a mixing chamber of four inches and more in diameter, there can be a tendency for the liquid hydrocarbon flow stream introduced into the mixing chamber to only partially impact the impingement surface of the impingement pin. The reason for this is that the liquid flow stream must pass a significant distance through the mixing chamber where it is subjected to a heavy cross flow of steam before impacting the impingement surface. This tends to cause a shift in the liquid flow stream away from the center of the impingement surface, the magnitude of which is dependent upon the velocities of the pressurized steam and liquid flow streams for a particular setup. The shift prevents a portion of the liquid hydrocarbon flow stream from being shattered against the impingement pin, resulting in a significant increase in droplet size for a portion of the spray volume that adversely affects the spray performance. In order to overcome such shift in the liquid flow stream introduced into the mixing chamber, heretofore it has been necessary to increase the liquid pressure to overcome the effect of the steam cross flow. This necessitates the need for larger and higher pressure process pumps that are more expensive to operate and more susceptible to breakdowns.

SUMMARY AND OBJECTS OF THE INVENTION

It is an object of the present invention to provide a liquid hydrocarbon spray nozzle assembly that is adapted for more effective and complete liquid atomization, and hence, improved spray performance in catalytic cracking reactors.

Another object is to provide a spray nozzle assembly as characterized above in which the liquid hydrocarbon flow stream introduced into the mixing chamber of the spray nozzle body is not adversely effected by the pressurized steam cross flow prior to engaging an impingement surface that shatters and transversely directs the liquid within a mixing zone.

A further object is to provide a spray nozzle assembly of the above kind that can be reliably operated without the need for higher pressure and more expensive process pumps.

Still another object is to provide a spray nozzle assembly of the foregoing type that is simpler in construction and lends itself to more economical manufacture. A related object is to provide such a spray nozzle assembly which eliminates the need for a separate impingement pin and its mounting structure within the nozzle body.

Yet a further object is to provide a spray nozzle assembly design of the foregoing type which lends itself to easy retrofitting of existing units in the field.

Other objects and advantages of the invention will become apparent upon reading the following detailed description and upon reference to the drawings, in which:

Figure 1:
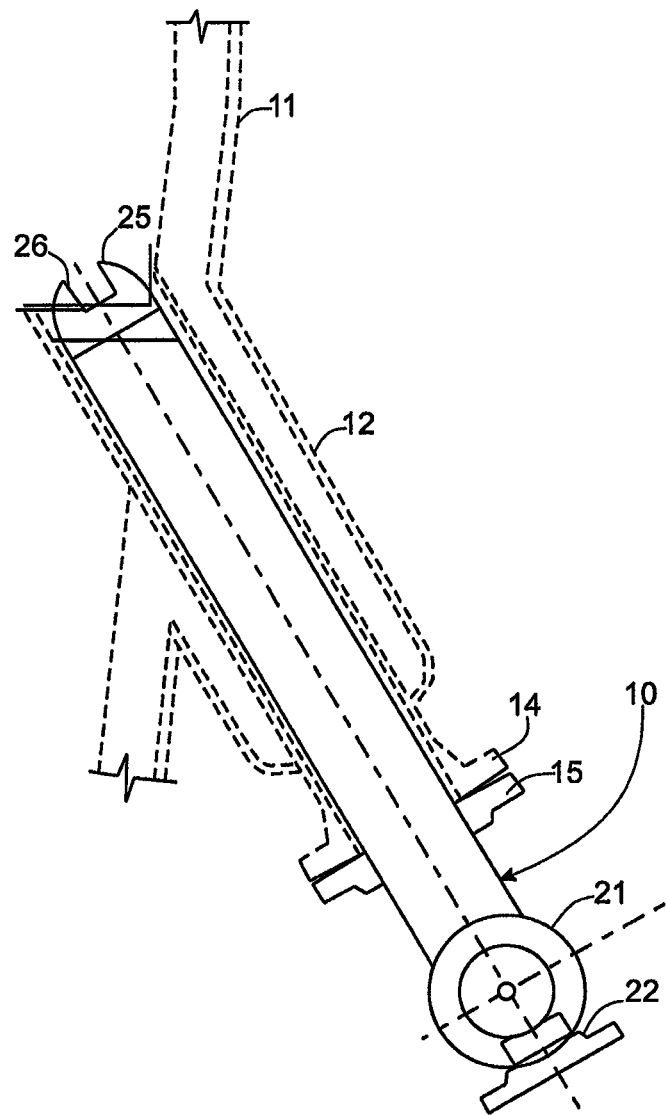
FIG. 1 is a schematic depiction of a spray nozzle assembly in accordance with the present invention mounted within the wall of a riser of a catalytic cracking reactor.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention. In that regard, while the illustrated spray nozzle assembly is particularly effective for atomizing and spraying liquid hydrocarbons in catalytic cracking systems, it will be understood that the utility of the nozzle assembly is not limited to that usage.

DESCRIPTION OF THE PREFERRED EMBODIMENT

Referring now more particularly to the drawings there is shown and illustrative spray nozzle assembly 10 in accordance with the invention mounted in a conventional manner in an insulated wall 11 (shown in phantom) of a riser of a fluidized catalytic reactor. The spray nozzle assembly 10 is supported in a tubular sleeve 12 fixed within the wall 11 at an acute angle to the vertical for discharging atomized liquid hydrocarbon upwardly into the riser. The tubular sleeve 12 in this case has an outwardly extending flange 14 to which a support flange 15 fixed to the spray nozzle assembly 10 may be secured.

Figure 2:
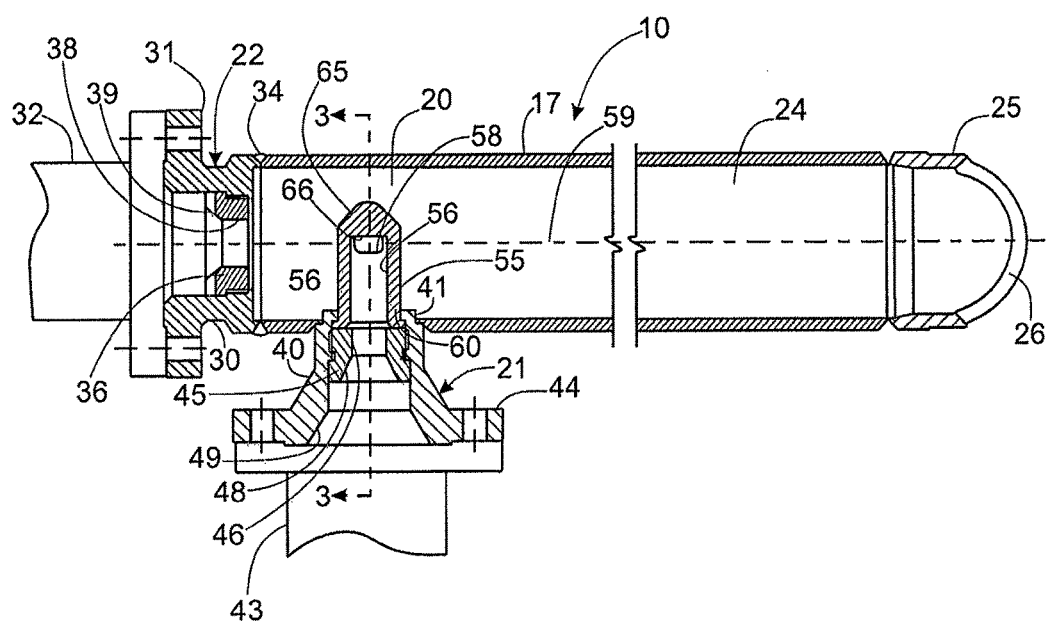
FIG. 2 is an enlarged longitudinal section of the spray nozzle assembly shown in FIG. 1.
Figure 3:
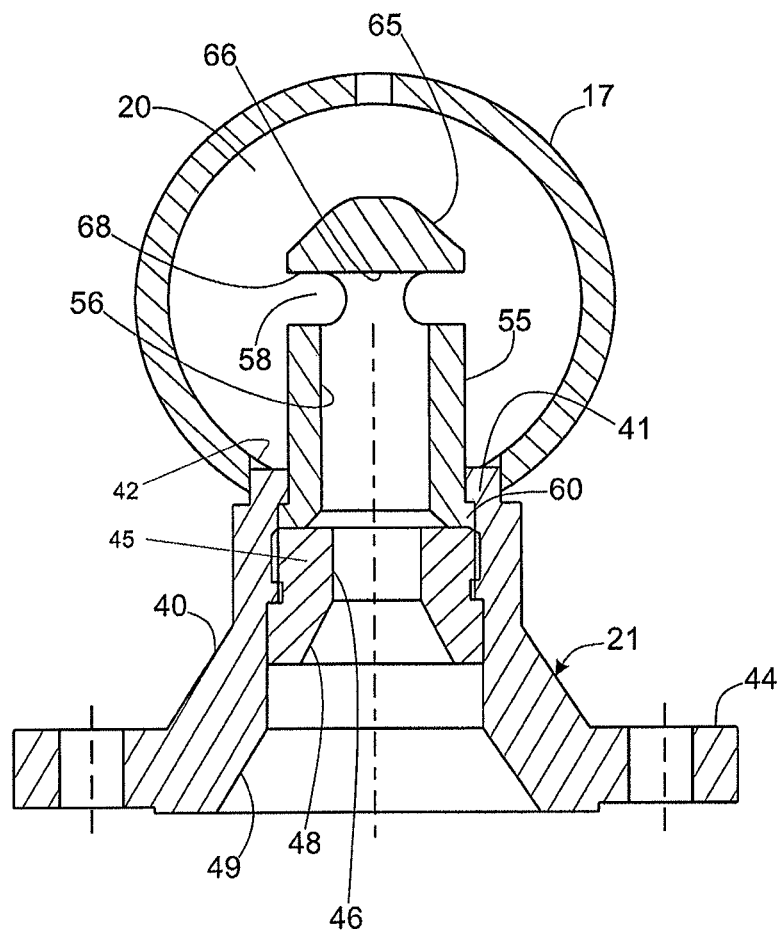
FIG. 3 is an enlarged transverse section taken in the plane of line 3-3 in FIG. 2

The illustrated spray nozzle assembly 10, as best depicted in FIG. 2, basically comprises a nozzle body in the form of an uninterrupted elongated tubular member 17 that defines a mixing zone 20 having a liquid hydrocarbon inlet 21 and a pressurized steam or other gas inlet 22 disposed on an outer side of the wall 11 of the riser and an elongated barrel extension zone 24 communicating with the mixing zone 20 disposed in and extending through the nozzle support sleeve 12 and riser wall 11. A spray tip 25 having one or more discharge orifices 26 is supported at a downstream end of the tubular member 17 within the riser for discharging and directing the atomized liquid spray. The tubular member 17 may be a single length of pipe, such as Schedule 80 steel pipe, having an internal diameter of between about 2 to 8 inches.

In accordance with the invention, the spray nozzle assembly is adapted for more effective and reliable spray performance, while having a simpler construction which eliminates the need for a separate impingement pin and mounting structure within the nozzle body. In the illustrated embodiment, the steam inlet 22 is mounted in an upstream end of the tubular member 17 and the liquid inlet 21 is mounted in a side wall of the tubular member 17 adjacent the upstream end. The steam inlet 22 includes a fitting 30 having a mounting flange 31 for securement to a supply line 32 coupled to a steam or other gas supply and a downstream cylindrical section for securement to an upstream axial end of the tubular member 17. The ends of the steam inlet fitting 30 and the tubular member 17 are chamfered for facilitating securement by a weldment 34. The steam inlet fitting 30 includes an orifice member 36 for defining a steam inlet passage 38 of predetermined diameter for the pressurized steam with an upstream conical section 39 for channeling steam into and through the inlet passage 38.

The liquid inlet 21, like the steam inlet 22, includes an inlet fitting 40. The liquid inlet fitting 40 has a reduced diameter counter bore section 41 that fits within an opening 42 in the tubular member 17, which in this case is formed with an inwardly tapered conical sidewall for facilitating securement of the fitting 40 to the tubular member 17 by an appropriate annular weldment. The liquid inlet fitting 40 has an upstream mounting flange 44 for securement of the fitting 40 to a supply line 43 which in turn is coupled to a suitable liquid hydrocarbon supply. The liquid inlet fitting 40 receives an internally mounted orifice member 45 that defines a liquid inlet flow passage 46 of predetermined diameter through which the feed liquid is directed. The illustrated orifice member 45 and fitting 40 have respective conical entry sections 48, 49 for channeling the feed liquid into and through the orifice member 45.

In accordance with this embodiment, the liquid inlet 21 has a liquid inlet extension and diffuser post 55 protruding into the mixing zone 20 having a central liquid extension passageway 56 communicating between the orifice member 45 and discharge orifices 58 which transversely direct liquid into the mixing zone 20 substantially at a central axis 59 of the mixing zone 20. In the illustrated embodiment, the liquid inlet extension and diffuser post 55 is a separate tubular member fixedly mounted in abutting relation to a downstream end of the liquid orifice member 45. The liquid inlet extension and diffuser post 55 in this instance has an upstream outwardly extending annular flange 60 that is clamped between a shoulder defined by an inner annular end of the fitting 40 and the downstream end of the orifice member 45. It will be understood that alternatively the orifice member 45 and the liquid inlet extension and diffuser post 55 could be made as a single part. In this case, the central extension passageway 56 of the liquid inlet extension and diffuser post 55 is larger in diameter than the orifice member passageway 46 for allowing unimpeded flow of liquid hydrocarbon through the extension and diffuser post 55.

In carrying out this embodiment, the liquid inlet extension and diffuser post 55 has a closed downstream terminal end 65 which defines a flat internal impingement surface 66 substantially on the central axis 59 of the mixing zone against which pressurized liquid hydrocarbon communicating through the extension passageway 56 impinges and is transversely directed and spread out relative to the central axis 59 of the mixing zone 20 and the cross flow of pressurized steam from the steam inlet 22. The discharge orifices 58 in this case communicate radially outwardly from diametrically opposed sides of the liquid inlet extension and diffuser post 55 and are formed by U-shaped cross slots or cutouts extending inwardly into intersecting relation with the central passageway 56 from opposite sides thereof. The upper sides 68 of the illustrated cross slots are substantially coplanar with the impingement surface 66 defined by the closed end 65 of the post 55 and the cross slots that define the discharge orifices 58 extend sufficiently into the extension passageway 56 that the discharge from discharge orifices 58 is in the form of two substantially flat fan patterns at the center of the steam cross flow. The outer terminal end 65 of the liquid inlet extension and diffuser post 55 in this case rounded for facilitating the passage of steam about the end of the post 55.

In operation, it will be seen that the liquid inlet extension and diffuser post 55 will shield the liquid flow stream from the steam cross flow until after it has impacted the internal impingement surface 66 of the post 55. This ensures that the liquid flow stream will fully impact the impingement surface 66 without any undesirable shift from the pressurized steam cross flow. Following impact with the internal impingement surface 66, the liquid spreads out through the cross slots that define the discharge orifices 58 in two flat fan spray patterns at the center of and transversely to the steam cross flow through the mixing zone 20 for maximum interaction and atomization of the discharging liquid. Since the liquid inlet extension and diffuser post 55 is directly subjected to the steam cross flow, preferably it is coated or produced with a wear resistant material, such as stellite or ceramic. It will be appreciated that the liquid inlet extension and diffuser post 55, when a separate component from the liquid orifice member 45, is adapted for easy retrofitting in the field that may have performance problems, particularly in spraying systems with relatively large diameter mixing zones 20. In that case, the existing impingement pin may be removed and replaced with a short length plug and the liquid inlet extension and diffuser post 55 installed in the liquid inlet 21.

From the foregoing, it can be seen that a spray nozzle assembly is provided for more reliably atomizing liquid hydrocarbon flow streams for improved spray performance in fluidized catalytic crocking systems. Yet, the spray nozzle assembly is relatively simple in construction, eliminates the need for a separate impingement post, and can be operated without the need for high pressure and more expensive processing pumps.

The invention claimed is:

1. A catalytic cracking system comprising: a riser; a spray nozzle assembly (10) supported within a wall (11) of the riser for discharging atomized liquid into the riser; said spray nozzle assembly (10) including an elongated a nozzle body (17) which defines a mixing zone (20) and an elongated barrel extension zone (24) longer in length than the mixing zone downstream and in communication with the mixing zone (20) extending through the riser wall (11), a liquid hydrocarbon supply, a liquid hydrocarbon inlet (21) supported by said elongated nozzle body (17) through which a pressurized liquid hydrocarbon stream from said liquid hydrocarbon supply is directed into said mixing zone (20), a steam supply, a steam inlet (22) mounted in an upstream axial end of said elongated nozzle body (17) through which pressurized steam from said steam supply is directed into said mixing zone (20) along a central axis (59) of the mixing zone (20) for atomizing liquid hydrocarbon directed into said mixing zone (20), a spray tip (25) mounted at a downstream end of said barrel extension zone (24) having a discharge orifice (26) through which atomized liquid hydrocarbon is discharged in a predetermined spray pattern, said liquid hydrocarbon inlet (21) including a liquid inlet extension and diffuser post (55) mounted in a sidewall of the elongated nozzle body (17) and extending into said mixing zone (20) in transverse relation to the central axis (59) of the mixing zone (20), said liquid inlet extension and diffuser post (55) having a liquid extension passageway (56) and a plurality of discharge orifices (58) at a downstream end of said liquid extension passageway (56), said liquid inlet extension and diffuser post (55) having a closed downstream terminal end that defines a flat impingement surface (66) substantially on the central axis of the mixing zone (20), said discharge orifices (58) of said liquid extension and diffuser post (55) being defined by a pair of cross slots extending through diametrically opposed sides of said liquid inlet extension and diffuser post (55) into communication with said liquid extension passageway (56), and said cross slots each having a side (68) co-planar with the flat impingement surface (66) such that said discharge orifices (58) direct liquid from said flat impingement surface (66) into said mixing zone (20) in a pair of flat fan spray patterns transversely to the central axis of the mixing zone (20) axial at the center of steam axis flow from the steam inlet (22).

2. The catalytic cracking system of claim 1 in which said elongated nozzle body is in the form of a one piece hollow cylindrical tubular member (17) that defines both said mixing zone (20) and said elongated barrel extension zone (24).

3. The catalytic cracking system of claim 2 in which said tubular member (17) is a single cylindrical pipe section.

4. The catalytic cracking system of claim 1 in which said liquid inlet (21) includes an orifice member (45) that defines a predetermined sized liquid inlet passage (46), and said liquid inlet extension and diffuser post (55) is a separate tubular member mounted downstream of said orifice member (45).

5. The catalytic cracking system of claim 4 in which said liquid extension passageway (56) of said liquid inlet extension and diffuser post (55) is larger in diameter than said inlet passage (46) of said orifice member (45).

6. The catalytic cracking systems of claim 1 in which said cross slots are u-shaped.

* * * * *